(12) United States Patent
Hennes et al.

(10) Patent No.: US 11,954,763 B2
(45) Date of Patent: Apr. 9, 2024

(54) METHOD FOR OPERATING A MOTOR VEHICLE

(71) Applicant: Ford Global Technologies, LLC, Dearborn, MI (US)

(72) Inventors: Nikica Hennes, Aachen (DE); Erik Chapman, Waterford Township, MI (US); Eike Schmidt, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 17/810,538

(22) Filed: Jul. 1, 2022

(65) Prior Publication Data
US 2023/0005191 A1   Jan. 5, 2023

(30) Foreign Application Priority Data
Jul. 5, 2021   (DE) .......................... 102021117327.2

(51) Int. Cl.
| | |
|---|---|
| *G06T 11/00* | (2006.01) |
| *G06F 3/14* | (2006.01) |
| *G06T 7/20* | (2017.01) |
| *G07C 5/02* | (2006.01) |

(52) U.S. Cl.
CPC ................ *G06T 11/00* (2013.01); *G06F 3/14* (2013.01); *G06T 7/20* (2013.01); *G06T 2207/30196* (2013.01); *G06T 2207/30268* (2013.01); *G07C 5/02* (2013.01)

(58) Field of Classification Search
None
See application file for complete search history.

(56) References Cited

U.S. PATENT DOCUMENTS

| | | | | |
|---|---|---|---|---|
| 2004/0100419 | A1* | 5/2004 | Kato | G09G 5/00 345/7 |
| 2005/0159865 | A1* | 7/2005 | Bos | B60R 16/0232 701/39 |
| 2017/0352129 | A1* | 12/2017 | Fu | H04N 23/683 |
| 2019/0022347 | A1* | 1/2019 | Wan | A61B 5/18 |
| 2019/0047498 | A1* | 2/2019 | Alcaidinho | B60R 16/037 |
| 2022/0020119 | A1* | 1/2022 | Grace | G06F 3/013 |
| 2022/0382050 | A1* | 12/2022 | Moll | B60K 35/00 |

* cited by examiner

*Primary Examiner* — Ryan M Gray
(74) *Attorney, Agent, or Firm* — Frank Lollo; Eversheds Sutherland (US) LLP

(57) ABSTRACT

The disclosure relates to a motor vehicle that loads a motor vehicle movement dataset (KBD) indicative of accelerations of the motor vehicle, loads a passenger movement dataset (PBD) indicative of movements of a passenger of the motor vehicle, evaluate the motor vehicle movement dataset (KBD) and the passenger movement dataset (PBD) by means of a transfer function with a predetermined threshold value (SW) in order to generate an image dataset (BS) for an infotainment system of the motor vehicle, and outputs the image dataset (BS) by means of the infotainment system.

14 Claims, 2 Drawing Sheets

METHOD FOR OPERATING A MOTOR VEHICLE

CROSS-REFERENCE TO RELATED PATENT APPLICATION

The present application claims priority to and the benefit of German Application No. 102021117327.2, filed Jul. 5, 2021, which is hereby incorporated by reference herein its entirety.

FIELD OF THE INVENTION

The invention relates to a method for operating a motor vehicle.

BACKGROUND

Different methods are known with which a driver of a motor vehicle is intended to be encouraged to drive the vehicle e.g. according to a particularly eco-friendly driving style.

A particularly eco-friendly driving style of this type is characterized by low accelerations. At the same time, a driving style of this type prevents the occurrence of motion sickness. A stable sitting position can also counteract the occurrence of motion sickness.

Methods with which feedback can be given based on the movements and/or posture and/or gestures of a driver and passengers of a motor vehicle are known in each case from JP 4882433 B2, U.S. Pat. Nos. 10,787,162 B2, 10,430,676 B2, JP 2005326962 A and U.S. Pat. No. 10,107,635 B2.

A need exists to find ways to counteract the occurrence of motion sickness.

BRIEF DESCRIPTION OF THE FIGURES

The invention will now be explained with reference to a drawing. In the drawing.

DETAILED DESCRIPTION

Figure 1:
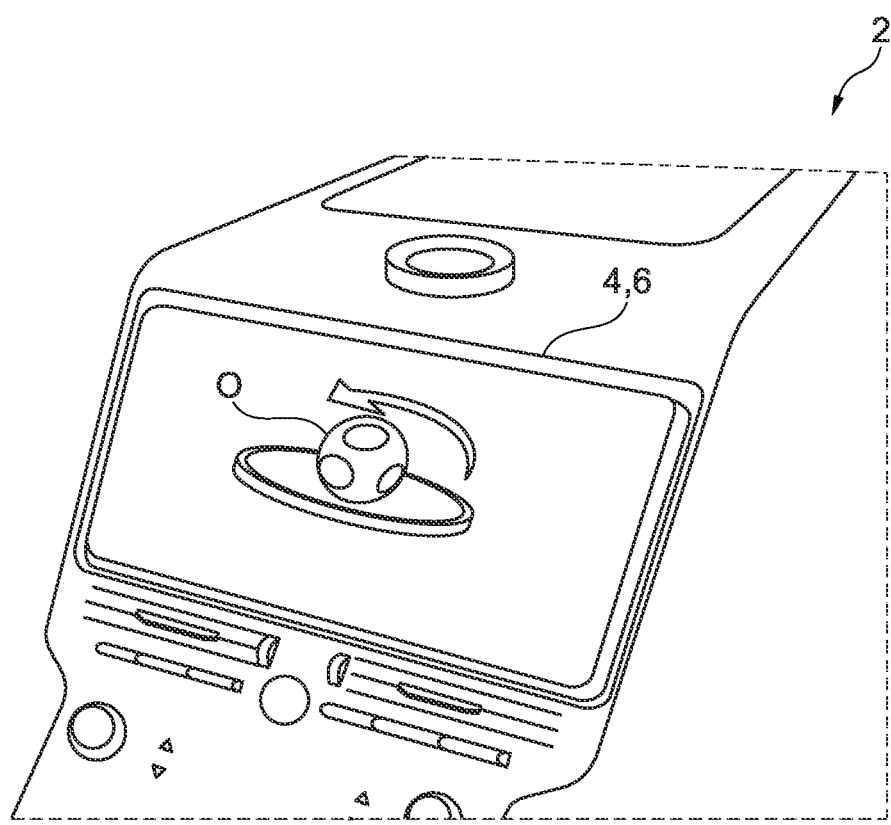
FIG. 1 shows a schematic view of an infotainment system of a motor vehicle.

The object of the invention is achieved by a method for operating a motor vehicle having the steps of:
  loading a motor vehicle movement dataset indicative of accelerations of the motor vehicle,
  loading a passenger movement dataset indicative of movements of a passenger of the motor vehicle,
  evaluating the motor vehicle movement dataset and the passenger movement dataset by means of a transfer function with a predefined threshold value in order to generate an image dataset for an infotainment system of the motor vehicle, and
  outputting the image dataset by means of the infotainment system.

In other words, the motor vehicle movement dataset indicative of accelerations of the motor vehicle is compared with the passenger movement dataset indicative of movements of the passenger of the motor vehicle and the corresponding image dataset is output if the threshold value for permissible movements is exceeded. Outputting the image dataset can comprise visualizing an equilibrium metaphor which can be performed with an HMI, such as a display screen of the infotainment system. Alternatively or additionally, the visualization can be performed with an HMI assigned to the infotainment system which has only a data transmission connection to the infotainment system, such as e.g. data glasses worn by the driver.

Feedback can thus be given to the driver through visualization of an equilibrium metaphor of this type, so that said driver can counteract the occurrence of motion sickness by means of a corresponding driving style.

According to one embodiment, loading the passenger movement dataset comprises loading a pressure distribution which is produced by a passenger sitting on a vehicle seat of the motor vehicle. The values of the pressure distribution can be captured e.g. with a plurality of pressure sensors which are arranged in the form of a mat in a sitting area or backrest of a vehicle seat. The changes therein over time can then be regarded as representative of movements of the passenger. A passenger movement dataset of this type can thus be defined in a particularly simple manner.

According to a further embodiment, loading the passenger movement dataset comprises loading an image dataset of a passenger of the motor vehicle. The image data of the image dataset can be obtained with a camera such as e.g. a CCD camera for monitoring the passenger compartment of the motor vehicle. A passenger movement dataset of this type can be defined in a particularly simple manner in this way also. The pressure distribution data and the image data of the image dataset can further be fused during an evaluation in order to obtain higher-quality data in this way.

According to a further embodiment, evaluating the motor vehicle movement dataset and the passenger movement dataset by means of a transfer function with a predefined threshold value comprises defining unintentional and intentional movements of the passenger. The threshold value can be regarded as a measure of normal movements of the passenger of the type which occur during a normal operation of the motor vehicle. It is therefore established by means of a comparison with the threshold value whether the passenger movement dataset describes unintentional or intentional movements of the passenger. If the threshold value is exceeded during operation, this shifts a visualized object according to the image dataset from an unstable equilibrium into a stable equilibrium, such as e.g. a visualized upright-standing egg into a lying position. The driver can thus be given feedback in a particularly simple manner.

The invention also relates to a computer program product, designed to carry out a method of this type, an infotainment system for a motor vehicle and a motor vehicle having an infotainment system of this type.

Reference now is first made to FIG. 1.

FIG. 1 shows an HMI 6, e.g. of an infotainment system 4 of a motor vehicle 2 which, in the present exemplary embodiment, is a passenger vehicle.

An infotainment system 4 is understood to mean the combination of an automobile radio, a navigation system, a hands-free device, driver assistance systems and further functions in a central operating unit.

An HMI 6 is understood to mean a human-machine interface. In the present exemplary embodiment, the HMI 4 is a display screen which can also be designed as touch-sensitive in order to enable e.g. a driver F to perform inputs. In contrast to the present exemplary embodiment, the HMI 6 can also be a head-up display or data glasses for augmented reality.

Figure 2:
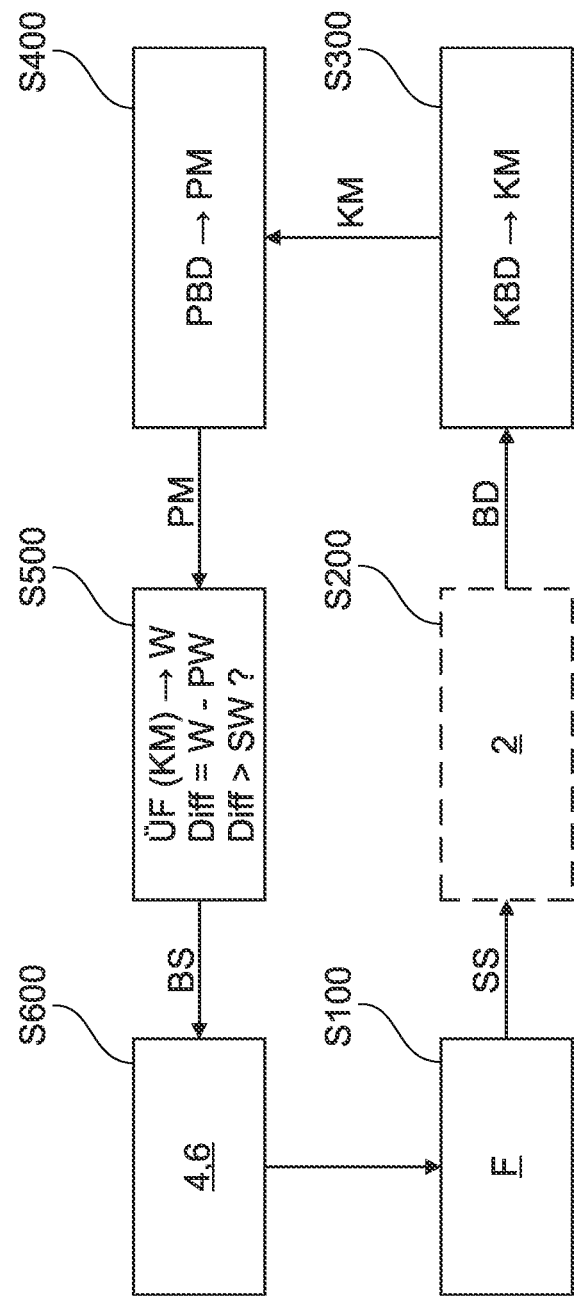
FIG. 2 shows a schematic view of a method sequence for operating the infotainment system shown in FIG. 1.

Reference is now additionally made to FIG. 2.

In order to counteract the occurrence of motion sickness, the infotainment system 4 is designed to load a motor vehicle movement dataset KBD indicative of accelerations of the motor vehicle 2. The motor vehicle movement dataset KBD therefore contains values for accelerations which occur while the motor vehicle 2 is travelling and can be captured with e.g. acceleration sensors (not shown) of the motor vehicle 2.

The infotainment system 4 is further designed to load a passenger movement dataset PBD indicative of movements of a passenger of the motor vehicle 2. The passenger movement dataset PBD therefore contains values which are representative of movements of the passenger.

The values which are representative of movements of the passenger can be representative of a pressure distribution which is produced by a passenger sitting on a vehicle seat of the motor vehicle 2. These values can be captured e.g. with a plurality of pressure sensors which are arranged in the form of a mat in a sitting area or backrest of a vehicle seat.

Furthermore, the values representing movements of the passenger can also be image data of an image dataset of the passenger. The image data of an image dataset can be obtained with a camera, such as e.g. a CCD camera for monitoring the passenger compartment (similarly not shown) of the motor vehicle 2.

In the present exemplary embodiment, the infotainment system 4 is designed to fuse the data of the pressure distribution and the image data of the image dataset during an evaluation in order to define the passenger movement dataset PBD.

In the present exemplary embodiment, the infotainment system 4 is further designed to evaluate the motor vehicle movement dataset KBD and the passenger movement dataset PBD in order to define intentional and unintentional movements of the passenger. Unintentional movements of the passenger are movements which are caused by the accelerations of the motor vehicle 2 in operation. In other words, these are essentially involuntary movements in response to external accelerations. Conversely, intentional movements cannot be assigned to such accelerations of the motor vehicle 2.

For this purpose, the infotainment system 4 uses a transfer function ÜF which links e.g. accelerations on the input side with movements of the passenger on the output side.

The transfer function ÜF has a predefined threshold value SW. The threshold value SW can be regarded as a measure of normal movements of the passenger of the type which occur during a normal operation of the motor vehicle 2.

In other words, if the threshold value SW is exceeded, an unwanted movement of the passenger is inferred.

In the present exemplary embodiment, the motor vehicle movement dataset KBD is evaluated for this purpose in order to define an acceleration measured value KM for the accelerations acting on the passenger during a predefined time interval. For this purpose, accelerations can be weighted differently in the direction of different spatial axes. Accelerations in the direction of travel and opposite the direction of travel, for example, can be weighted less than accelerations along spatial axes across the direction of travel of the motor vehicle 2. Furthermore, in the present exemplary embodiment, the passenger movement dataset PBD is evaluated in order to define a movement measured value PM for movements and/or gestures performed by the passenger during a predefined time interval.

In the present exemplary embodiment, a corresponding value W for the movement measured value PM can be defined for the acceleration measured value KM by means of the transfer function ÜF.

The difference Diff between the corresponding value W defined with the transfer function ÜF and the movement measured value PM is then defined and compared with the threshold value SW.

In contrast to the present exemplary embodiment, it can also be provided that a corresponding value for the acceleration measured value PM is defined with the transfer function ÜF in the present exemplary embodiment for the movement measured value PM, a difference between the corresponding value defined with the transfer function ÜF and the acceleration measured value KM is defined and compared with a threshold value.

The infotainment system 4 is further designed to generate and then also output an image dataset BS for the HMI 6 of the motor vehicle 2.

In the present exemplary embodiment, the image dataset BS serves to visualize an equilibrium metaphor. In other words, if the threshold value is exceeded during operation, this shifts a visualized object O from an unstable equilibrium into a stable equilibrium, e.g. an upright-standing egg into a lying position.

In particular, the infotainment system 4 of the motor vehicle 2 can have correspondingly designed computer hardware, processor, memory and/or software components for implementing these described tasks and functions. For instance, the processor may execute software to provide the described tasks and functions described herein.

A method sequence for operating the infotainment system 4 will now be explained.

In a first step S100, the motor vehicle 2 is controlled by the driver F, wherein control signals SS are transmitted, e.g. via a CAN bus of the motor vehicle 2, to different components of the motor vehicle 2, such as e.g. for the steering, brakes or the powertrain of the motor vehicle 2.

The driver F can further perform inputs, e.g. by means of the HMI 6, before the start of the journey, with which he can define one or more parameters which characterize at least a predefined driving style, such as e.g. a particularly sporty driving style or a more comfortable driving style with comparatively significantly reduced accelerations. A value for the threshold value SW which is greater for a sporty driving style than for a more comfortable driving style can be derived from these parameters.

In a further step S200, the operating data BD of the motor vehicle 2 come into play, with which e.g. values for accelerations in the direction of different spatial axes are associated.

In a further step S300, the values produced by the operating data BD for the accelerations are then captured in a first partial step with acceleration sensors of the motor vehicle and are provided in the form of the motor vehicle movement dataset KBD. The acceleration measured value KM is further defined in a further partial step.

In a further step S400, a pressure distribution produced by the passenger sitting on the vehicle seat of the motor vehicle 2 is captured in a first partial step. Image data of the image dataset of the passenger are captured in a further partial step. The data representing the pressure distribution or the changes therein over time and the image data of the image dataset are combined by means of sensor fusion into the passenger movement dataset PBD. The movement measured value PM is further defined in a further partial step.

In a further step S500, it is established for the evaluation in a first partial step by means of the transfer function ÜF through comparison with the threshold value SW whether the passenger movement dataset PBD describes unintentional or intentional movements of the passenger. The image dataset BS is further generated in a further partial step. As already described, the image dataset BS serves in the present exemplary embodiment to visualize an equilibrium metaphor. If the threshold value SW is exceeded, this shifts the visualized object O from an unstable equilibrium into a stable equilibrium, wherein the object O in the unstable equilibrium is an upright-standing egg, and in the stable equilibrium a lying egg.

In a further step S600, the image dataset BS is output through visualization by means of the infotainment system 4, i.e. with the HMI 6 assigned to the infotainment system 4, in order to give feedback to the driver F in this way.

In contrast to the present exemplary embodiment, the sequence of the steps or partial steps can also be different. A plurality of steps or partial steps can furthermore also be carried out concurrently or simultaneously. Individual steps or partial steps of the method can furthermore also be omitted or skipped.

Feedback can thus be given to the driver F through visualization of an equilibrium metaphor of this type so that said driver can counteract the occurrence of motion sickness by means of a corresponding driving style.

The invention claimed is:

1. A method for operating a motor vehicle, having the steps of:
    loading a motor vehicle movement dataset (KBD) indicative of accelerations of the motor vehicle,
    loading a passenger movement dataset (PBD) indicative of movements of a passenger of the motor vehicle,
    evaluating the motor vehicle movement dataset (KBD) and the passenger movement dataset (PBD) using a transfer function (TF) with a predetermined threshold value (SW),
    determining, based on the evaluation, that a difference between the motor vehicle movement dataset (KBD) and the passenger movement dataset (PBD) exceeds the predetermined threshold value (SW),
    determining, based on the determination that the difference exceeds the predetermined threshold value (SW), that the movements of the passenger are unintentional,
    generating, based on the determination that the movements of the passenger are unintentional, an image dataset (BS) for an infotainment system of the motor vehicle, and
    outputting the image dataset (BS) by the infotainment system.

2. The method according to claim 1, wherein the loading of the passenger movement dataset (PBD) comprises loading a pressure distribution which is produced by a passenger sitting on a vehicle seat of the motor vehicle.

3. The method according to claim 1, wherein loading the passenger movement dataset (PBD) comprises loading an image dataset of a passenger of the motor vehicle.

4. The method of claim 1, wherein outputting the image dataset includes outputting an equilibrium metaphor.

5. An Infotainment system for a motor vehicle, wherein the infotainment system comprises a processor configured to:
    load a motor vehicle movement dataset (KBD) indicative of accelerations of the motor vehicle,
    load a passenger movement dataset (PBD) indicative of movements of a passenger of the motor vehicle, and
    evaluate the motor vehicle movement dataset (KBD) and the passenger movement dataset (PBD) by means of a transfer function with a predetermined threshold value (SW),
    determine, based on the evaluation, that a difference between the motor vehicle movement dataset (KBD) and the passenger movement dataset (PBD) exceeds the predetermined threshold value (SW),
    determine, based on the determination that the difference exceeds the predetermined threshold value (SW), that the movements of the passenger are unintentional, and
    generate, based on the determination that the movements of the passenger are unintentional, an image dataset (BS) for an infotainment system of the motor vehicle.

6. The Infotainment system of claim 5, wherein the infotainment system is further designed to load the passenger movement dataset (PBD) with a pressure distribution which is produced by a passenger sitting on a vehicle seat of the motor vehicle.

7. The Infotainment system of claim 5, wherein the infotainment system is designed to load the passenger movement dataset (PBD) with an image dataset of a passenger of the motor vehicle.

8. The infotainment system of claim 5, wherein the infotainment system is designed to output the image dataset.

9. The infotainment system of claim 8, wherein the image dataset is includes an equilibrium metaphor.

10. A non-transitory computer readable medium storing a computer program configured to:
    load a motor vehicle movement dataset (KBD) indicative of accelerations of the motor vehicle,
    load a passenger movement dataset (PBD) indicative of movements of a passenger of the motor vehicle,
    evaluate the motor vehicle movement dataset (KBD) and the passenger movement dataset (PBD) by means of a transfer function with a predetermined threshold value (SW),
    determine, based on the evaluation, that a difference between the motor vehicle movement dataset (KBD) and the passenger movement dataset (PBD) exceeds the predetermined threshold value (SW),
    determine, based on the determination that the difference exceeds the predetermined threshold value (SW), that the movements of the passenger are unintentional, and
    generate, based on the determination that the movements of the passenger are unintentional, an image dataset (BS) for an infotainment system of the motor vehicle.

11. The method of claim 1, wherein the loading of the passenger movement dataset (PBD) comprises a fusion of a pressure distribution for movement of the passenger which is produced by a passenger sitting on a vehicle seat of the motor vehicle and an image dataset of movement of the passenger.

12. The method of claim 1, wherein evaluating the motor vehicle movement dataset (KBD) and the passenger movement dataset (PBD) further comprises determining an acceleration measured value (KM) for accelerations acting on the passenger.

13. The method of claim 12, wherein the accelerations acting on the passenger are weighted depending on a direction of acceleration.

14. The method of claim 1, wherein the predetermined threshold value is based on an input to the infotainment system of the motor vehicle by the passenger.

* * * * *